United States Patent
Sharma et al.

(10) Patent No.: US 11,967,102 B2
(45) Date of Patent: Apr. 23, 2024

(54) KEY POINTS DETECTION USING MULTIPLE IMAGE MODALITIES

(71) Applicant: Shanghai United Imaging Intelligence Co., Ltd., Shanghai (CN)

(72) Inventors: Abhishek Sharma, Boston, MA (US);
Arun Innanje, Lexington, MA (US);
Ziyan Wu, Lexington, MA (US)

(73) Assignee: Shanghai United Imaging Intelligence Co., Ltd., Shanghai (CN)

( * ) Notice: Subject to any disclaimer, the term of this patent is extended or adjusted under 35 U.S.C. 154(b) by 419 days.

(21) Appl. No.: 17/378,495

(22) Filed: Jul. 16, 2021

(65) Prior Publication Data

US 2023/0013508 A1    Jan. 19, 2023

(51) Int. Cl.
| | | |
|---|---|---|
| G06T 7/73 | (2017.01) | |
| G06N 3/045 | (2023.01) | |
| G06T 7/00 | (2017.01) | |
| G06V 40/10 | (2022.01) | |

(52) U.S. Cl.
CPC .............. *G06T 7/73* (2017.01); *G06N 3/045* (2023.01); *G06T 7/0012* (2013.01); *G06V 40/103* (2022.01); *G06T 2207/10024* (2013.01); *G06T 2207/10028* (2013.01); *G06T 2207/10048* (2013.01); *G06T 2207/20081* (2013.01);
(Continued)

(58) Field of Classification Search
CPC ........... G06T 7/73; G06T 7/0012; G06T 2207/10024; G06T 2207/10028; G06T 2207/10048; G06T 2207/20081; G06T 2207/20084; G06T 2207/30196; G06N 3/045; G06N 3/0464; G06N 3/084; G06N 3/09; G06V 40/103; G06V 40/10; G06V 10/44; G06V 10/454; G06V 10/82
See application file for complete search history.

(56) References Cited

U.S. PATENT DOCUMENTS

| | | | |
|---|---|---|---|
| 10,521,927 B2 * | 12/2019 | Teixeira | A61B 6/08 |
| 10,740,658 B2 | 8/2020 | Pollach et al. | |
| 2017/0032222 A1 * | 2/2017 | Sharma | G06V 30/194 |

(Continued)

FOREIGN PATENT DOCUMENTS

| | | | | |
|---|---|---|---|---|
| CN | 104700381 B | 6/2015 | | |
| CN | 108229440 A | 6/2018 | | |
| JP | 2020042476 A | * | 3/2020 | G06T 7/73 |

OTHER PUBLICATIONS

Buker et al, HRDepthNet: Depth Image-Based Marker-Less Tracking of Body Joints, 2021, Sensors, 21(1356): 1-17. (Year: 2021).*
(Continued)

*Primary Examiner* — John Villecco
*Assistant Examiner* — Kathleen M Broughton
(74) *Attorney, Agent, or Firm* — Zhong Law LLC (57) ABSTRACT

Image-based key points detection using a convolutional neural network (CNN) may be impacted if the key points are occluded in the image. Images obtained from additional imaging modalities such as depth and/or thermal images may be used in conjunction with RGB images to reduce or minimize the impact of the occlusion. The additional images may be used to determine adjustment values that are then applied to the weights of the CNN so that the convolution operations may be performed in a modality aware manner to increase the robustness, accuracy, and efficiency of key point detection.

16 Claims, 5 Drawing Sheets

(52) U.S. Cl.
CPC ............... *G06T 2207/20084* (2013.01); *G06T 2207/30196* (2013.01)

(56) References Cited

U.S. PATENT DOCUMENTS

| | | | |
|---|---|---|---|
| 2017/0337732 A1* | 11/2017 | Tamersoy | G06V 40/103 |
| 2020/0211154 A1* | 7/2020 | Ng | A61B 5/1128 |
| 2021/0150726 A1* | 5/2021 | Kao | G06T 15/00 |
| 2022/0108468 A1* | 4/2022 | Nakamura | G06V 40/103 |

OTHER PUBLICATIONS

Du X et al, Patch-based adaptive weighting with segmentation and scale (PAWSS) for visual tracking in surgical video, 2019, Med Image Analysis 57(2019): 120-135. (Year: 2019).*

\* cited by examiner

KEY POINTS DETECTION USING MULTIPLE IMAGE MODALITIES

BACKGROUND

Knowledge about the locations of a patient's key anatomical structures plays a very important role in clinical settings. Using joint locations as an example, information about where the joints are located may be used to construct models for determining the patient's body shape and/or pose, from which insights may be gained with respect to the patient's positioning, physiological features, proper radiation dosage levels, etc. The joint locations may be automatically determined using deep learning (DL) based object detection techniques based on images of the patient captured during a medical procedure. Generally, these techniques work by distinguishing features (e.g., intensity, contrast, curvature, etc.) of an image that are associated with the joint locations from the rest of the patient's body or image background. As such, the techniques rely on having substantial portions of the patient's body visible (e.g., unoccluded) in the image. In many medical environments, however, the patient's body may be blocked or covered, at least partially, by medical equipment, radiation shields, hospital gowns, etc., making it difficult to obtain accurate estimation of the joint locations using the aforementioned techniques. Hence, it is highly desirable to develop systems, methods, and instrumentalities that have the ability to detect key points (e.g., such as joint locations) from an image of the patient even if those key points are partially or completely blocked in the image.

SUMMARY

Described herein are systems, methods, and instrumentalities associated with detecting key points (e.g., joint locations) of an object based on images of the object. The detection may be performed by obtaining a first image of the object that includes a first imaging property, obtaining a second image of the object that includes a second imaging property, and processing the first image through a convolutional neural network (CNN) based on at least the first imaging property and the second imaging property. The CNN may include a first convolution layer configured to perform a first set of convolution operations on the first image based on the first imaging property. The first convolution layer may comprise multiple kernels, each of which may be associated with a respective set of weights, and the performance of the first set of convolution operations may include adjusting the set of weights associated with each of the multiple kernels of the first convolution layer based on the second imaging property included in the second image.

In examples, the first image may include a red/green/blue (RGB) image of the object and the second image may include a depth or thermal image of the object. In examples, the one or more key points may be occluded in the first image, and the detection may be facilitated by the second image. In examples, the CNN may further include a second convolution layer having multiple kernels each associated with a respective second set of weights, and the detection may be accomplished by performing a second set of convolution operations on an output produced by the first convolution layer, where the second set of weights associated with each of the multiple kernels of the second convolution layer are adjusted based on the second imaging property. In examples, when performing the second set of convolution operations on the output produced by the first convolution layer, the second set of weights associated with each of the multiple kernels of the second convolution layer may not be adjusted based on the second imaging property.

In examples, the adjustment to the set of weights associated with each of the multiple kernels of the first convolution layer may be performed as follows. For each pixel of the first image, identifying a corresponding pixel in the second image, determining an adjustment amount based on the second imaging property associated with the corresponding pixel in the second image, and adjusting a weight of the first convolution layer to be applied to the pixel of the first image in accordance with the determined adjustment amount. In examples, each pixel of the first image may belong to a patch of pixels to be sampled by a kernel of the first convolution layer, and the adjustment may be determined by determining a patch of pixels in the second image that corresponds to the patch of pixels to be sampled in the first image, and determining the adjustment based on the second imaging property associated with two or more pixels of the corresponding patch of pixels in the second image.

In examples, the adjustment described herein may be indicated by a weightage map or another suitable data structure. In examples, the one or more key points of the object may be determined using a single branch of the CNN configured to process the first image in conjunction with the second image.

BRIEF DESCRIPTION OF THE DRAWINGS

A more detailed understanding of the examples disclosed herein may be obtained from the following description, given by way of example in conjunction with the accompanying drawing.

DETAILED DESCRIPTION

The present disclosure is illustrated by way of example, and not by way of limitation, in the figures of the accompanying drawings.

Figure 1:
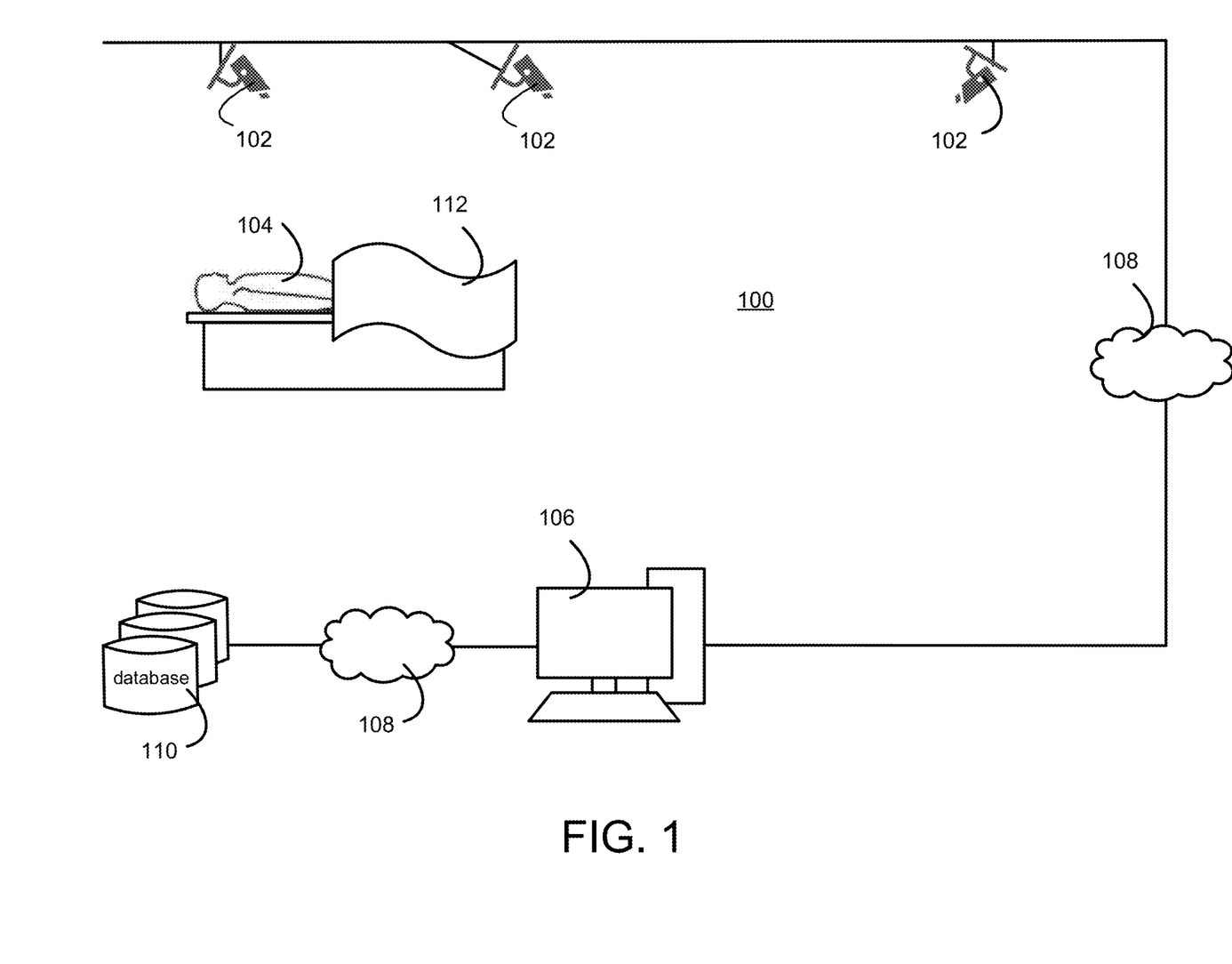
FIG. 1 is a block diagram illustrating an example environment in which one or more embodiments described herein may be implemented.

FIG. 1 is a diagram illustrating an example environment 100 associated with one or more of the embodiments described herein. The environment 100 may be part of a medical facility such as a scan room (e.g., magnetic resonance imaging (MRI), X-ray, Computed Tomography (CT), etc.) or an operating room (OR), a rehabilitation facility, a fitness center, etc. The environment 100 may be equipped with one or more sensing devices 102 such as one or more digital cameras configured to capture images of a patient 104 inside the environment 100. The sensing devices 102 may be installed at various locations of the environment 100 and may be communicatively coupled to a processing device 106 and/or other devices of the environment 100 via a communication network 108. Each of the sensing devices 102 may include one or more sensors such as 2D visual sensors (e.g., 2D cameras), 3D visual sensors (e.g., 3D cameras), red, green and blue (RGB) sensors, depth sensors, RGB plus depth (RGB-D) sensors, thermal sensors (e.g., infrared (FIR) or near-infrared (NIR) sensors), radar sensors, and/or other types of image capturing devices or circuitries. Thus, depending on the type(s) of sensors included therein the sensing devices 102 may be capable of generating RGB images, depth images, thermal images, etc. of the patient 104 that may be used to determine key anatomical features (e.g., joint locations) of the patient in accordance with one or more embodiments described herein.

The processing unit 106 may be configured to process the images captured by the sensing devices and determine the locations of key anatomical structures of the patient 104 based on the images. These anatomical locations may include, for example, joint locations (e.g., elbows, shoulders, wrists, knees, ankles, etc.) that may be used to construct models (e.g., 2D or 3D human mesh models) for determining the body shape and/or pose of the patient during a medical procedure (e.g., an MRI, X-ray, or CT procedure). The processing unit 106 may be configured to perform the key point detection and/or model construction tasks using deep learning based methods. For example, the processing unit 106 may include one or more processors (e.g., graphical processing units (GPUs)) and memory configured to implement an artificial neural network (ANN) pre-trained to perform the aforementioned tasks. The processing unit 106 may be configured to store the processing results (and/or the images captured by the sensing devices 102) to a database 110 communicatively coupled to the processing unit 106 (e.g., via the communication link 108).

Instead of or in addition to transmitting the images to the processing unit 106 and having the processing unit 106 perform the key point detection and/or model construction operations, one or more of the sensing devices 102 may include a functional unit (e.g., a processor) configured to perform a part or the entirety of the operations. The one or more sensing devices 102 may be communicatively coupled to other devices located inside or outside of the environment 100, for example, via respective communication circuits comprised in the sensing devices 102 and the communication link 108, such that the other devices may facilitate the performance of the tasks described herein. The sensing devices 102 may also be communicatively coupled to the database 110 via the communication link 108 and be configured to store the images and/or processing results produced by the sensing devices to the database 110. Each of the sensing devices 102 may be a stand-alone device or may be a part of an edge device configured to perform tasks such as remote patient monitoring, automated care delivery, distributed information collection and analysis, etc.

While inside the environment 100, the patient 104 may be covered (e.g., blocked or otherwise occluded) by another object such as a covering sheet 112. As a result, the part(s) of the patient's body (e.g., knees and/or ankles) covered by the sheet 112 may be invisible in the images (e.g., RGB images) of the patient 104 captured by one or more of the sensing device 102 (e.g., RGB image sensors). The processing unit 106 and/or the sensing devices 102 (e.g., respective function units of the sensing devices) may be configured to detect key anatomical features (e.g., joint locations) of the patient 104 based on these images even if the anatomical features are blocked or occluded by another object (or otherwise being invisible) in the images. For example, the processing unit 106 and/or the sensing devices 102 (e.g., respective function units of the sensing devices) may be configured to compensate for the blockage or occlusion by utilizing information collected from multiple image modalities. In one or more embodiments, this may include detecting key points of the patient based on one or more of depth, thermal (e.g., infrared), or radar images in conjunction with an RGB image. In one or more embodiments, this may include performing weighted modality aware convolution operations on an input image produced by a first imaging modality based on information (e.g., depth, thermal, etc.) obtained from a second imaging modality. In one or more embodiments, this may include calculating a plurality of adjustment values (e.g., in the form of a weightage map) based on a second image and adjusting the parameters (e.g., weights associated one or more convolution kernels) of a neural network used to process a first image based on the adjustment values.

Figure 2:
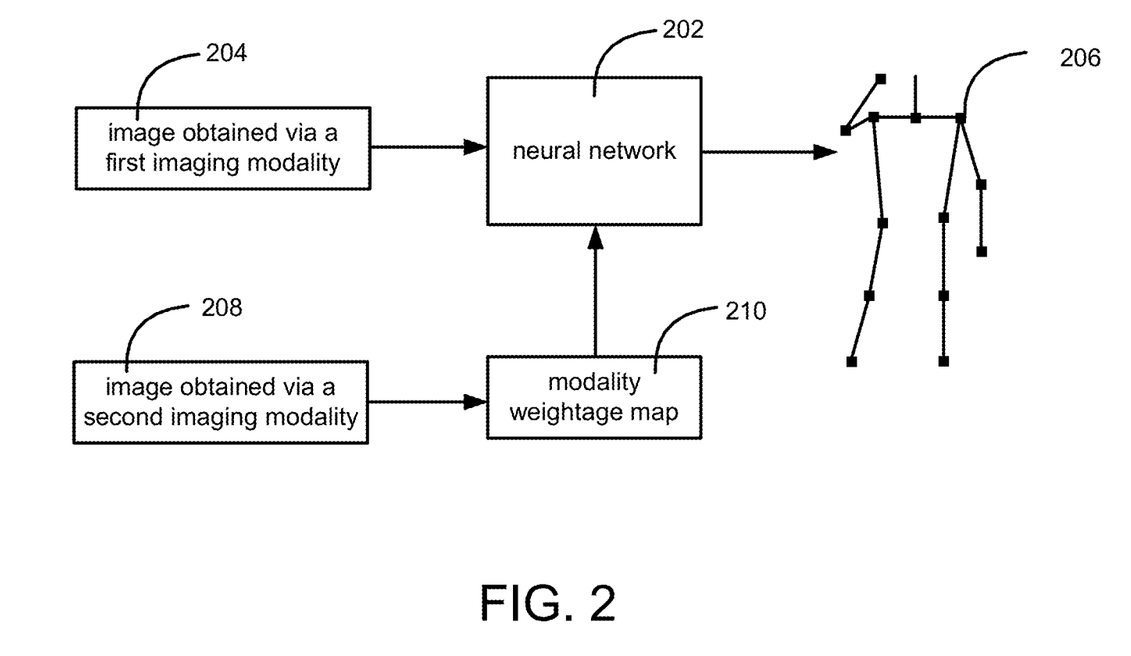
FIG. 2 is a block diagram illustrating an example of determining key anatomical points of a patient using deep learning based methods and multiple imaging modalities in accordance with one or more embodiments described herein.

FIG. 2 illustrates an example of determining key anatomical features of a patient using deep learning based methods and multiple imaging modalities. The figure will be described using joint locations as an example, but it should be appreciated that the techniques described herein may also be applicable to other anatomical structures of the human body. Also, even though one artificial neural network (ANN) is shown in the figure, it should be appreciated that the techniques described herein may also be realized using multiple ANNs.

As shown in FIG. 2, an ANN 202 may be configured to obtain (e.g., receive) a first image 204 of a patient produced by a first imaging modality, determine one or more joint locations of the patient based at least on the first image 204, and generate an output 206 indicating the one or more determined joint locations. In examples, the first image 204 may be an RGB image and the first imaging modality may include an RGB sensing device such as the sensing device 102 shown in FIG. 1. As such, the first image 204 may be characterized by one or more RBG properties associated with the patient. In examples, one or more parts (e.g., joints) of the patient's body may be occluded by another object (e.g., a covering sheet) in the image 204. As a result, imagery information associated with the occluded parts of the patient's body may not be available to the ANN 202 or may be blended in with imagery information of the blocking object, potentially impacting the accuracy of the joint location prediction made by ANN 202.

The ANN 202 may be further configured to obtain information associated with a second image 208 of the patient produced by a second imaging modality and utilize the information to improve the accuracy and/or efficiency (e.g., speed) of the joint location detection operation. For example, the second image 208 may be a depth image, a thermal image (e.g., including an infrared image), a radar image, and/or a combination thereof, and the second imaging modality may include a depth, thermal, or radar sensing device such as the sensing device 102 shown in FIG. 1. As such, the second image 208 may be characterized by one or more depth, thermal, or radar-sensible properties associated with the patient. The ANN 202 may be configured to obtain (e.g., calculate or receive) a plurality adjustment values that reflect the depth, thermal, and/or radar properties captured in the second image 208, and apply those adjustment values to the processing of the first image 204.

In examples, the ANN 202 may include a plurality of convolutional layers, one or more pooling layers, and/or one or more fully connected layers. In examples, each of the convolutional layers may include a plurality of convolution kernels or filters configured to identify specific features in the input image 204 that may represent a joint location. The convolution kernels or filters may be associated with respective weights, W, that, when applied to an input, may produce an output indicating whether a certain visual feature or pattern has been detected. Using two-dimensional (2D) convolution as an example, the convolution operations may be represented by the following equation:

$$y(p_0) = \sum_{p_n \in R} w(p_n) \cdot x(p_0 + p_n) \quad (1)$$

where R may represent a grid corresponding to a convolution kernel (e.g., a 3×3 convolutional kernel), $x(p_0+p_n)$ may represent an input value at pixel $(p_0+p_n)$, $y(p_0)$ may represent an output value at pixel $p_0$, and $w(p_n)$ may represent the weight at the offset $p_n$ in the convolution kernel.

The convolution operations performed by the ANN 202 may be followed by batch normalization and/or linear or non-linear activation, and the features extracted by the convolutional layers may be down-sampled through one or more pooling layers (e.g., using a 2×2 window and a stride of 2) to reduce the redundancy and/or dimension of the features (e.g., by a factor of 2). As a result of the convolution and/or down-sampling operations, respective feature representations of the input image 204 may be obtained, for example, in the form of one or more feature maps or feature vectors.

The ANN 202 may also include a plurality of transposed convolutional layers and/or one or more un-pooling layers. Through these layers, the ANN 202 may perform a series of up-sampling and/or transposed convolution operations based on the feature map(s) or feature vector(s) produced by the down-sampling operation described above. For example, the ANN 202 may up-sample (e.g., using 3×3 transposed convolution kernels with a stride of 2) the feature representations based on pooled indices stored in the down-sampling stage to restore the features extracted from the input image 204 in the output 206.

When a joint of the patient is occluded in the image 204, it may become challenging to accurately determine where that joint is located since imagery information (e.g., color, intensity, etc.) that could be used to distinguish the joint location from other parts of the image is missing from the image. The ANN 202 may be configured to utilize the additional information provided by the image 208 to compensate for the occlusion or blockage. For instance, the ANN 202 may be configured to modify the convolution operations described herein based on adjustment values determined from the image 208. These adjustment values may be determined, for example, as a modality weightage map 210, and may operate to distinguish a blocked or occluded joint location from other parts of the patient's body or other objects (e.g., a sheet covering the joint) in the image 204. Using a depth image as an example of the image 208, such an image may include information that indicates the depth properties of a joint (e.g., pixels of the joint may be associated with respective depth values). Thus, even if the joint is blocked by another object and becomes indistinguishable from the other object in the image 204 (e.g., an RGB image), the joint can still be distinguished from the other object based on the image 208 since pixels associated with the joint may have different depth values than pixels of the other object (e.g., the joint may be underneath or behind the other object). The same may be also true for thermal or other imaging modalities so long as those imaging modalities are capable of providing additional information to distinguish a key point of interest.

In examples, the ANN 202 may be configured to perform the modality aware convolution operations as follows. Denoting the weightage map (e.g., or another data structure comprising the adjustment values described herein) as $M_D$, the convolution operations shown above may be modified based on the following equation:

$$Y(p_0) = \sum_{p_n \in R} w(p_n) \cdot M_D(p_0, p_0 + p_n) \cdot x(p_0 + p_n) \quad (2)$$

The weightage map (e.g., adjustment values) may be derived based on the image 208 using various techniques. For example, an adjustment value associated with pixel position $(p_i, p_j)$ in the image 204 may be determined as follows:

$$M_D(p_i, p_j) = e^{-(C|I(p_i) - I(p_j)|^2)} \quad (3)$$

where C may be a predetermined constant value, and $I(p_i)$ and $I(p_j)$ may represent respective property values (e.g., depth, thermal, intensity, etc.) associated with corresponding pixel positions $p_i$ and $p_j$ in the image 208. For example, as indicated by (1), each pixel in the image 204 may belong to a patch of pixels to be sampled by a convolution kernel, and the adjustment values may be determined by identifying a patch of pixels in the second image that corresponds to the patch of pixels in the first image, and determining the adjust values based on the second imaging property associated with pixels (e.g., two or more pixels) of the corresponding patch of pixels in the second image, as illustrated by (2) and (3).

The ANN 202 may be configured to modify all or a subset of the convolution operations with the modality aware convolution operations described herein. For example, the ANN 202 may be configured to modify the convolution operations of every convolutional layer or only a subset of the convolutional layers. Further, the adjustment values to be applied to the weights of one or more convolutional layers may be determined in real time (e.g., dynamically) as the image 204 is processed through the one or more layers.

Using the techniques described herein, the number of parameters associated with the ANN 202 may remain substantially the same compared to a regular convolution network, thus preventing the ANN 202 from becoming too complex. Further, the technique may not require additional branches to be added to the ANN 202, which may lead to lower complexity and/or faster processing speed compared to a multi-branch network. Accordingly, the operations described herein may be performed on a device with full computing power (e.g., the processing unit 106 of FIG. 1) or on a sensing or edge device with reduced computing power (e.g., the sensing device 102 shown in the FIG. 1).

Figure 3A:
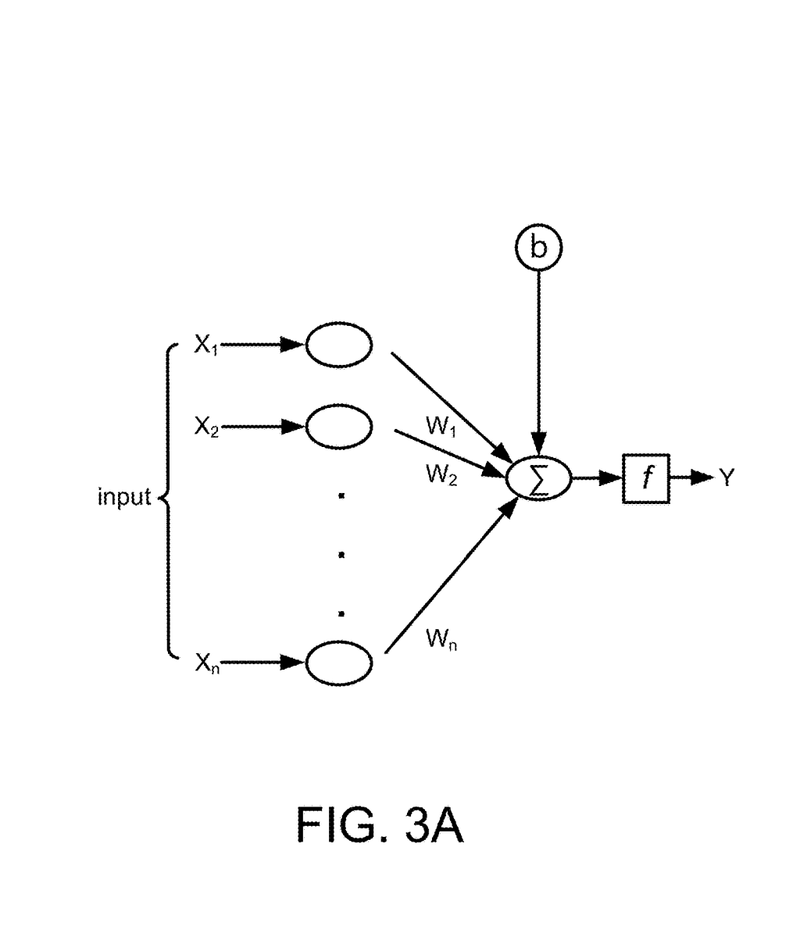
FIGS. 3A and 3B are block diagrams respectively illustrating example convolution operations that may be performed by a regular convolutional neural network and a modality aware convolutional neural network in accordance with one or more embodiments described herein.
Figure 3B:
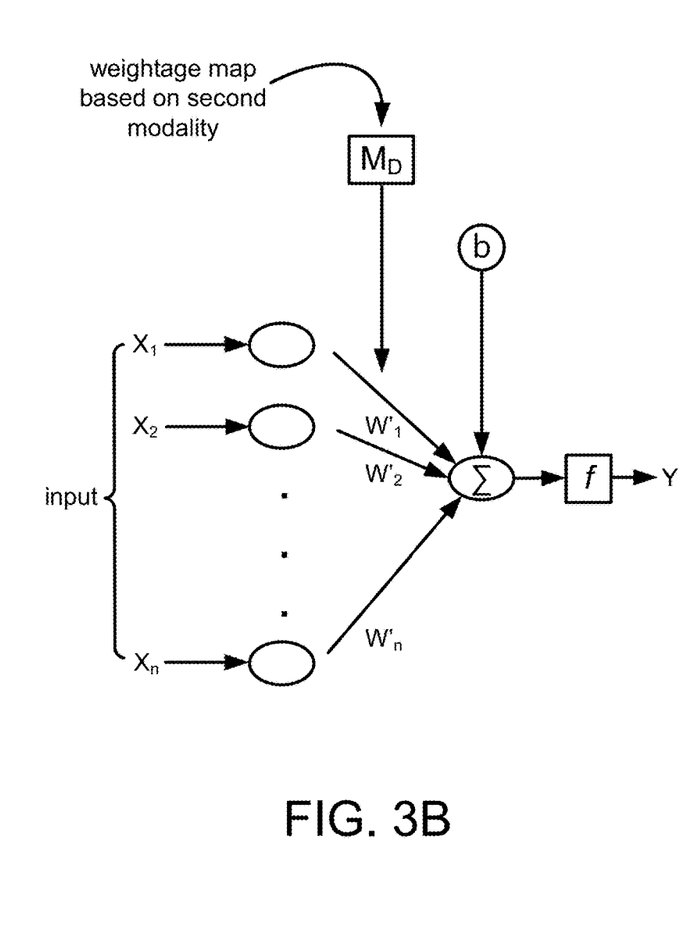

FIG. 3A illustrates example convolution operations that may be performed by a regular convolutional neural network. As shown, the processing of an input X obtained from a first imaging modality through a convolutional layer may comprise applying respective weights ($W_1, W_2 \ldots W_n$), a bias value, b, and/or an activation function, f, to the input to obtain an output Y. FIG. 3B illustrates example convolution operations that may be performed by a modality aware convolutional neural network as described herein. As shown, the processing of an input X obtained from a first imaging modality through a convolutional layer may comprise adjusting the respective weights ($W_1, W_2 \ldots W_n$) associated with the convolutional layer with adjustment values determined based on information obtained a second imaging modality, and applying the adjusted weights, a bias value, b, and/or an activation function, f, to the input to obtain an output Y.

Figure 4:
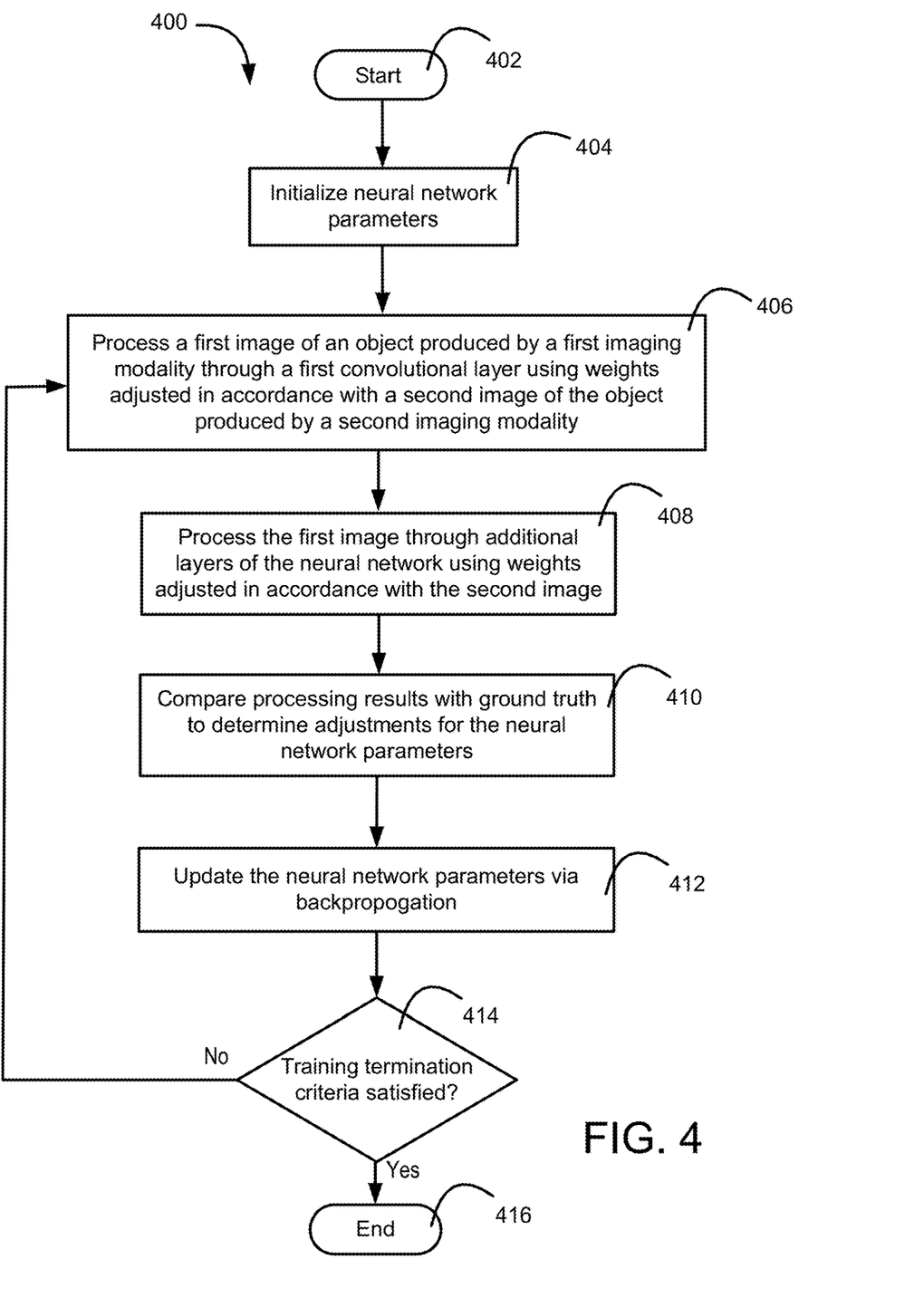
FIG. 4 is a flow diagram illustrating an example process for training a neural network to perform a key point detection task in accordance with one or more embodiments described herein.

FIG. 4 illustrates an example process 400 for training a neural network (e.g., the ANN 202 shown in FIG. 2) to perform the key point detection operations described herein. The training may be performed using images collected from multiple imaging modalities including, for example, RGB, thermal, depth, radar, and/or the like. The process 400 may start at 402 and, at 404, initial parameters of the neural network (e.g., weights associated with various filters or kernels of the neural network) may be initialized. The parameters may be initialized, for example, based on samples collected from one or more probability distributions or parameter values of another neural network having a similar architecture. At 406, the neural network may receive a first image (e.g., an RGB image) associated with an object (e.g., a patient) and a second image (e.g., a depth image) associated with the object, and process the first image through a first convolutional layer. The processing may comprise adjusting the parameters (e.g., weights) associated with the first convolutional layer based on adjustment values (e.g., a weightage map) calculated based on the second image. At 408, the neural network may process the output produced by the first layer through one or more additional convolutional layers, and at each convolutional layer, the neural network may adjust the parameters (e.g., weights) associated with the layer based on adjustment values calculated in accordance with corresponding pixels of the second image. At 410, the results predicted by the neural network may be compared to a ground truth to determine adjustments that need to be made to the neural network parameters. The adjustments may be determined, for example, based on a loss function (e.g., MSE, L1, L2, etc.) and a gradient descent (e.g., a stochastic gradient decent) associated with the loss function.

At 412, the neural network may apply the adjustments to the presently assigned network parameters, for example, through a backpropagation process. At 414, the neural network may determine whether one or more training termination criteria are satisfied. For example, the neural network may determine that the training termination criteria are satisfied if the neural network has completed a pre-determined number of training iterations, if the difference between the prediction result and a ground truth value is below a predetermined threshold, or if the change in the value of the loss function between two training iterations falls below a predetermined threshold. If the determination at 414 is that the training termination criteria are not satisfied, the neural network may return to 406. If the determination at 414 is that the training termination criteria are satisfied, the neural network may end the training process 400 at 416.

For simplicity of explanation, the training steps are depicted and described herein with a specific order. It should be appreciated, however, that the training operations may occur in various orders, concurrently, and/or with other operations not presented or described herein. Furthermore, it should be noted that not all operations that may be included in the training process the are depicted and described herein, and not all illustrated operations are required to be performed.

Figure 5:
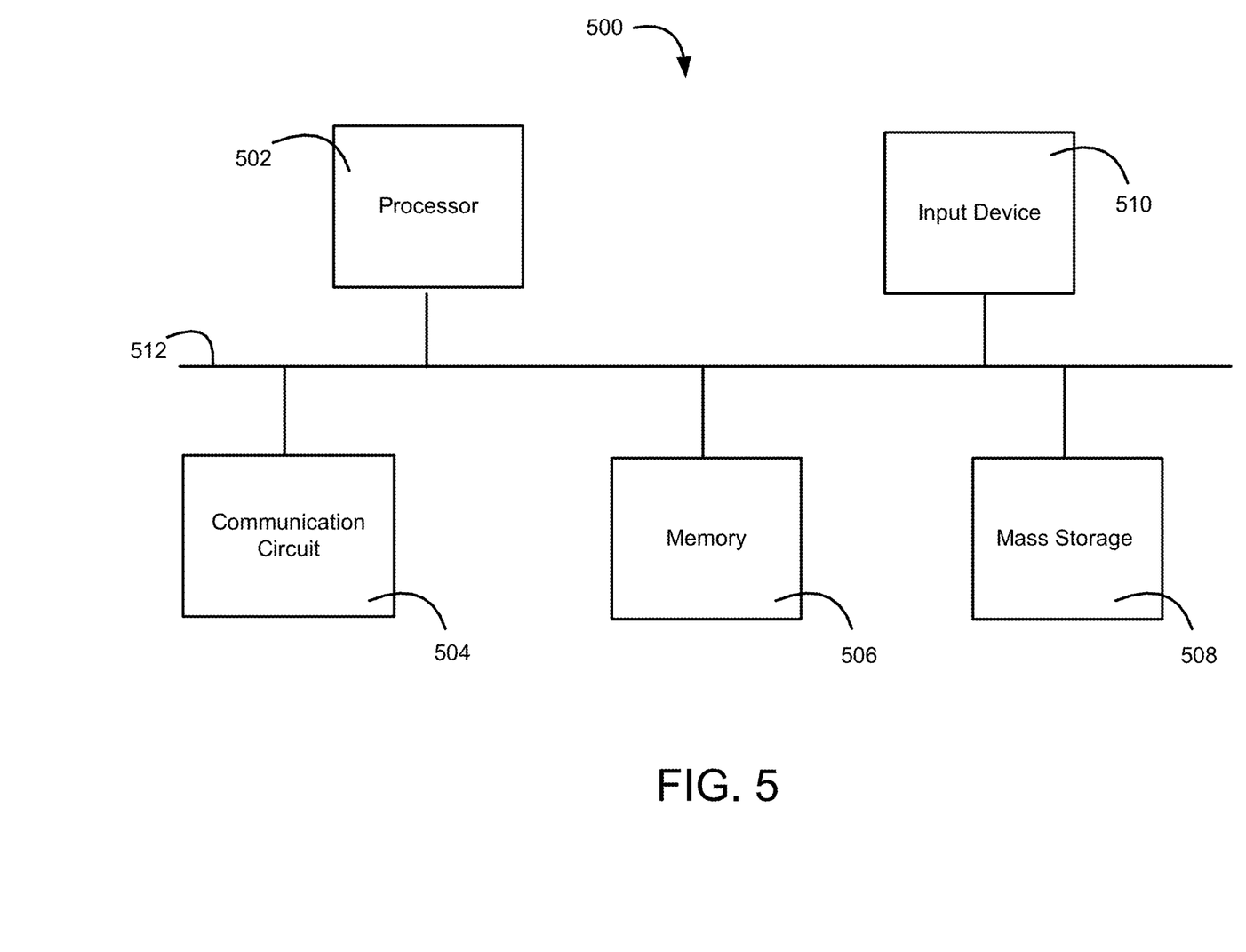
FIG. 5 is a block diagram illustrating example components of an apparatus that may be used to perform a key point detection task in accordance with one or more embodiments described herein.

The systems, methods, and/or instrumentalities described herein may be implemented using one or more processors, one or more storage devices, and/or other suitable accessory devices such as display devices, communication devices, input/output devices, etc. FIG. 5 is a block diagram illustrating an example apparatus 500 that may be configured to perform the key point detection operations described herein. As described herein, the apparatus 500 may be a standalone device such as the process unit 106 shown in FIG. 1, or the apparatus 500 may be an edge device configured to perform tasks such as remote patient monitoring, automated care delivery, distributed information collection and analysis, etc. The apparatus 500 may also be a part of a sensing device such as the sensing device 102 that may also comprise an image sensor.

As shown in FIG. 5, the apparatus 500 may include a processor (e.g., one or more processors) 502, which may be a central processing unit (CPU), a graphics processing unit (GPU), a microcontroller, a reduced instruction set computer (RISC) processor, application specific integrated circuits (ASICs), an application-specific instruction-set processor (ASIP), a physics processing unit (PPU), a digital signal processor (DSP), a field programmable gate array (FPGA), or any other circuit or processor capable of executing the functions described herein. The apparatus 500 may further include a communication circuit 504, a memory 506, a mass storage device 508, an input device 510, and/or a communication link 512 (e.g., a communication bus) over which the one or more components shown in the figure may exchange information.

The communication circuit 504 may be configured to transmit and receive information utilizing one or more communication protocols (e.g., TCP/IP) and one or more communication networks including a local area network (LAN), a wide area network (WAN), the Internet, a wireless data network (e.g., a Wi-Fi, 3G, 4G/LTE, or 5G network). The memory 506 may include a storage medium (e.g., a non-transitory storage medium) configured to store machine-readable instructions that, when executed, cause the processor 502 to perform one or more of the functions described herein. Examples of the machine-readable medium may include volatile or non-volatile memory including but not limited to semiconductor memory (e.g., electrically programmable read-only memory (EPROM), electrically erasable programmable read-only memory (EEPROM)), flash memory, and/or the like. The mass storage device 508 may include one or more magnetic disks such as one or more internal hard disks, one or more removable disks, one or more magneto-optical disks, one or more CD-ROM or DVD-ROM disks, etc., on which instructions and/or data may be stored to facilitate the operation of the processor 502. The input device 510 may include a keyboard, a mouse, a voice-controlled input device, a touch sensitive input device (e.g., a touch screen), and/or the like for receiving user inputs to the apparatus 500.

It should be noted that the apparatus 500 may operate as a standalone device or may be connected (e.g., networked or clustered) with other computation devices to perform the functions described herein. And even though only one instance of each component is shown in FIG. 5, a skilled person in the art will understand that the apparatus 500 may include multiple instances of one or more of the components shown in the figure.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure. In addition, unless specifically stated otherwise, discussions utilizing terms such as "analyzing," "determining," "enabling," "identifying," "modifying" or the like, refer to the actions and processes of a computer system, or similar electronic computing device, that manipulates and transforms data represented as physical (e.g., electronic) quantities within the computer system's registers and memories into other data represented as physical quantities within the computer system memories or other such information storage, transmission or display devices.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

The invention claimed is:

1. A method for detecting key points of an object, the method comprising:
obtaining a first image of the object, wherein the first image comprises a first imaging property of the object;
obtaining a second image of the object, wherein the second image comprises a second imaging property of the object; and
processing the first image through a convolutional neural network (CNN) based on at least the first imaging property and the second imaging property to determine one or more key points of the object, wherein:
the CNN comprises a first convolution layer that includes multiple kernels each associated with a respective set of weights;
processing the first image through the CNN comprises performing, via the first convolution layer of the CNN, a first set of convolution operations on the first image based on the first imaging property of the object; and
performing the first set of convolution operations on the first image comprises, for a pixel that belongs to a patch of the first image:
identifying a corresponding patch in the second image;
adjusting a weight of the first convolution layer to be applied to the pixel, wherein the adjustment is made based on the second imaging property associated with two or more pixels of the corresponding patch in the second image; and
performing the first set of convolution operations based on the adjusted weight of the first convolution layer.

2. The method of claim 1, wherein the first image comprises a red/green/blue (RGB) image of the object and the second image comprises a depth or thermal image of the object.

3. The method of claim 1, wherein the one or more key points are occluded in the first image.

4. The method of claim 1, wherein the CNN further comprises a second convolution layer that includes multiple kernels each associated with a respective second set of weights, the method further comprises performing a second set of convolution operations on an output of the first convolution layer, and wherein the second set of weights associated with each of the multiple kernels of the second convolution layer is adjusted based on the second imaging property of the object during the performance of the second set of convolution operations.

5. The method of claim 1, wherein the CNN further comprises a second convolution layer that includes multiple kernels each associated with a respective second set of weights, the method further comprises performing a second set of convolution operations on an output of the first convolution layer, and wherein the second set of weights associated with each of the multiple kernels of the second convolution layer is not adjusted based on the second imaging property of the object during the performance of the second set of convolution operations.

6. The method of claim 1, wherein the CNN comprises multiple additional convolution layers each associated with a respective set of weights, the method further comprises performing convolution operations on the first image via the multiple additional convolution layers, and wherein the respective set of weights associated with each of the multiple additional convolution layers is adjusted based on the second imaging property of the object during the performance of the convolution operations.

7. The method of claim 1, wherein the one or more key points of the object are determined using a single branch of the CNN configured to process the first image in conjunction with the second image.

8. The method of claim 1, wherein the one or more key points include a joint location.

9. An apparatus configured to detect key points of an object, the apparatus comprising:
one or more processors configured to:
obtain a first image of the object, wherein the first image comprises a first imaging property of the object;
obtain a second image of the object, wherein the second image comprises a second imaging property of the object; and
process the first image through a convolutional neural network (CNN) based on at least the first imaging property and the second imaging property to determine one or more key points of the object, wherein:
the CNN comprises a first convolution layer that includes multiple kernels each associated with a respective set of weights;
the one or more processors being configured to process the first image through the CNN comprises the one or more processors being configured to perform, via the first convolution layer of the CNN, a first set of convolution operations on the first image based on the first imaging property; and
the one or more processors being configured to perform the first set of convolution operations on the first image comprises the one or more processors being configured to, for a pixel that belongs to a patch of the first image:
identify a corresponding patch in the second image;
adjust a weight of the first convolution layer to be applied to the pixel, wherein the adjustment is made based on the second imaging property associated with two or more pixels of the corresponding patch in the second image; and
perform the first set of convolution operations based on the adjusted weight of the first convolution layer.

10. The apparatus of claim 9, wherein the first image comprises a red/green/blue (RGB) image of the object and the second image comprises a depth or thermal image of the object.

11. The apparatus of claim 9, wherein the one or more key points are occluded in the first image.

12. The apparatus of claim 9, wherein the CNN further comprises a second convolution layer that includes multiple kernels each associated with a respective second set of weights, the one or more processors are further configured to perform a second set of convolution operations on an output of the first convolution layer, and wherein the second set of weights associated with each of the multiple kernels of the second convolution layer is adjusted based on the second imaging property of the object during the performance of the second set of convolution operations.

13. The apparatus of claim 9, wherein the CNN further comprises a second convolution layer that includes multiple kernels each associated with a respective second set of weights, the one or more processors are further configured to perform a second set of convolution operations on an output of the first convolution layer, and wherein the second set of weights associated with each of the multiple kernels of the second convolution layer is not adjusted based on the second imaging property of the object.

14. The apparatus of claim 9, wherein the CNN comprises multiple additional convolution layers each associated with a respective set of weights, the one or more processors are further configured to perform convolution operations on the first image via the multiple additional convolution layers, and wherein the respective set of weights associated with each of the multiple additional convolution layers is adjusted based on the second imaging property of the object during the performance of the convolution operations.

15. The apparatus of claim 9, wherein the one or more key points of the object are determined using a single branch of the CNN configured to process the first image in conjunction with the second image.

16. The apparatus of claim 9, wherein the one or more key points include a joint location.

\* \* \* \* \*